United States Patent
Ansari et al.

(10) Patent No.: US 12,271,249 B2
(45) Date of Patent: Apr. 8, 2025

(54) ADVANCED LINK POWER MANAGEMENT FOR DISPLAYPORT

(71) Applicant: Intel Corporation, Santa Clara, CA (US)

(72) Inventors: Nausheen Ansari, Folsom, CA (US); Ziv Kabiry, Kfar-Saba (IL); Gal Yedidia, Bitzaron (IL)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 17/127,417

(22) Filed: Dec. 18, 2020

(65) Prior Publication Data

US 2021/0103327 A1    Apr. 8, 2021

(51) Int. Cl.
| | |
|---|---|
| G06F 1/3234 | (2019.01) |
| G06F 1/3203 | (2019.01) |
| G06F 1/3287 | (2019.01) |
| G06T 1/20 | (2006.01) |
| H04N 21/44 | (2011.01) |

(52) U.S. Cl.
CPC .......... *G06F 1/3265* (2013.01); *G06F 1/3203* (2013.01); *G06F 1/3287* (2013.01); *G06T 1/20* (2013.01); *H04N 21/44004* (2013.01)

(58) Field of Classification Search
CPC .... G06F 1/3203; G06F 1/3265; G06F 1/3287; G06T 1/20; G09G 2330/022; G09G 2340/0435; G09G 2370/10; G09G 5/006; H04N 21/44004
See application file for complete search history.

(56) References Cited

U.S. PATENT DOCUMENTS

| | | | | |
|---|---|---|---|---|
| 2010/0079444 | A1* | 4/2010 | Kyriazis | G06T 3/4092 345/418 |
| 2010/0080218 | A1* | 4/2010 | Kwa | G06F 3/14 370/389 |
| 2011/0157198 | A1* | 6/2011 | Vasquez | G09G 5/003 345/545 |
| 2012/0079295 | A1 | 3/2012 | Hayek et al. | |
| 2014/0173320 | A1 | 6/2014 | Tripathi | |
| 2015/0113308 | A1* | 4/2015 | Hayek | G06F 3/0659 713/323 |
| 2015/0261718 | A1 | 9/2015 | Campbell et al. | |

(Continued)

OTHER PUBLICATIONS

EPO; Extended European Search Report issued in EP Patent Application No. 21197824.2, dated Mar. 11, 2022; 10 pages.

(Continued)

Primary Examiner — Terrell S Johnson
(74) Attorney, Agent, or Firm — Alliance IP, LLC

(57) ABSTRACT

An apparatus comprising circuitry to buffer video data; and a DisplayPort Transmitter to communicate the video data to a DisplayPort Receiver via a virtual channel through at least one intermediate device between the DisplayPort Transmitter and the DisplayPort Receiver, wherein the virtual channel comprises a unidirectional Main-Link and a bidirectional auxiliary channel (AUX_CH); and communicate a power down signal over the Main-Link to the at least one intermediate device and the DisplayPort Receiver in conjunction with turning off the Main-Link to place the at least one intermediate device and the DisplayPort Receiver in respective low power states.

20 Claims, 8 Drawing Sheets

(56) References Cited

U.S. PATENT DOCUMENTS

2017/0344512 A1 11/2017 Jen et al.
2019/0042507 A1 2/2019 Venkatesan et al.

OTHER PUBLICATIONS

EPO; Partial European Search Report issued in EP Patent Application No. 21198428.1, dated Feb. 16, 2022; 21 pages.
EPO; Extended European Search Report issued in EP Patent Application No. 21198428.1, dated May 17, 2022; 20 pages.
U.S. Non-Final Office Action received in U.S. Appl. No. 17/247,649, dated Feb. 12, 2024, 12 pages.
EPO Communication Pursuant to Article 94(3) EPC in EP Application Serial No. 21198428.1 mailed on Jul. 24, 2024, 25 pages.

* cited by examiner

| Encoding | Power Down Signal | Sequence |
|---|---|---|
| 8b_10b | ML_PHY_SLEEP 302 | K28.5, K27.7, K28.5, K27.7, K28.5, K27.7, K28.5, K28.5 |
| 8b_10b | ML_PHY_STANDBY 304 | K28.5, K27.7, K28.5, K27.7, K28.5, K27.7, K27.7, K27.7 |
| 128b_132b | ML_PHY_SLEEP 306 | CDI + 89898989, 89898989, 89898989, 89898989 |
| 128b_132b | ML_PHY_STANDBY 308 | CDI + 89555555, 89555555, 89555555, 89555555 |

ADVANCED LINK POWER MANAGEMENT FOR DISPLAYPORT

BACKGROUND

Modern computing systems such as desktop computing systems may include a display coupled to a computing device. The display may be coupled to the computing device using a link through which the display and the computing device communicate.

BRIEF DESCRIPTION OF THE DRAWINGS

FIG. 3 illustrates example power down signal sequences in accordance with certain embodiments.

DETAILED DESCRIPTION

Figure 1:
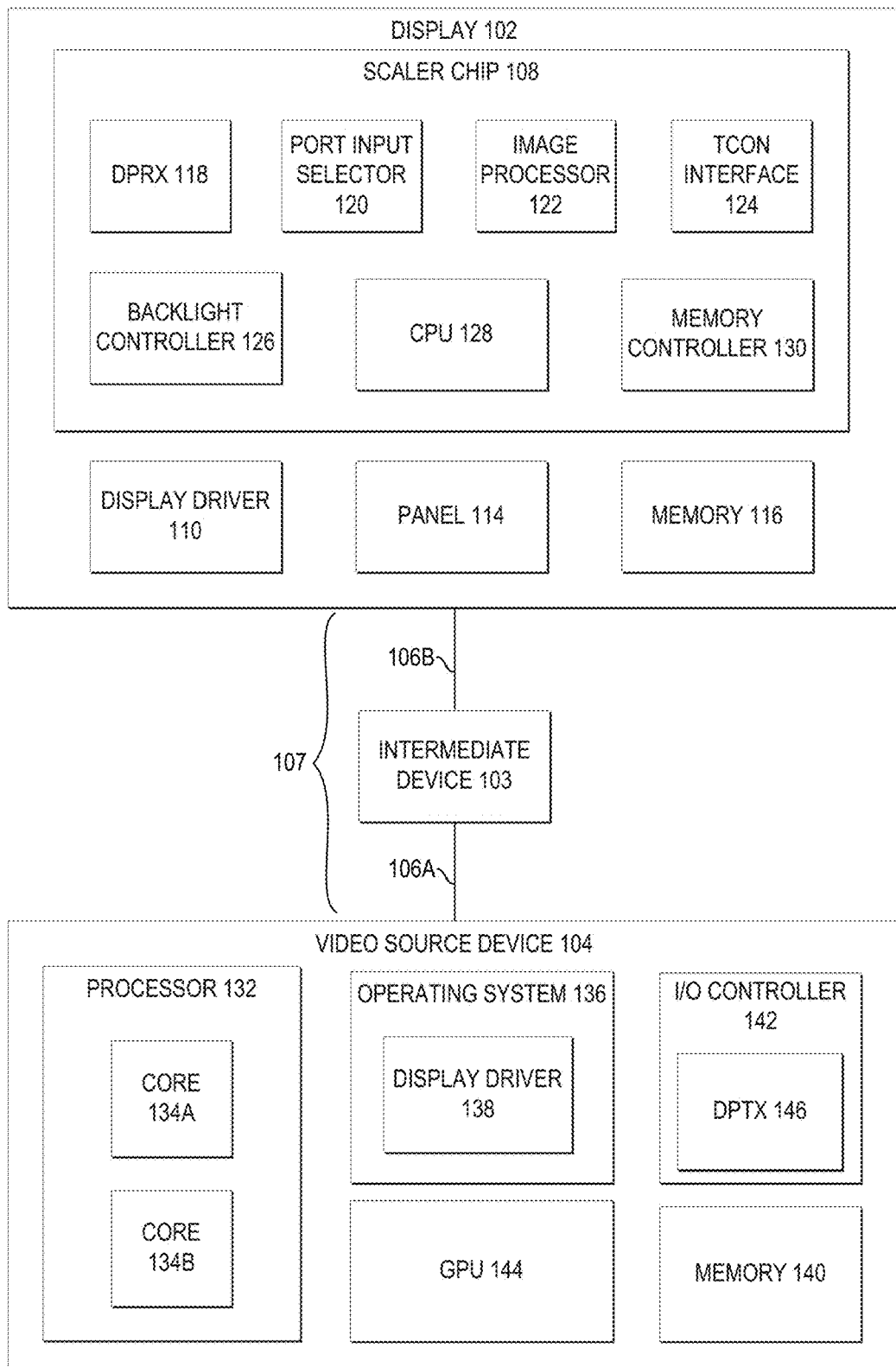
FIG. 1 illustrates a block diagram of a computing system implementing advanced link power management in accordance with certain embodiments.

FIG. 1 illustrates a block diagram of a computing system 100 implementing advanced link power management in accordance with certain embodiments. Computing system 100 comprises a display 102 (which is an example of a "video sink device" or "sink device") coupled to a video source device 104 (also referred to herein as a "source device") via a virtual channel 107 comprising link 106A, intermediate device 103, and link 106B.

Advanced Link Power Management (ALPM) techniques are available in the Video Electronics Standards Association (VESA) Embedded DisplayPort (eDP) Standard (e.g., version 1.4b) but these techniques do not address link power management over an entire display topology which may include one or more intermediate devices (e.g., 103) between a source device and one or more sink devices. The intermediate devices 103 could include one or more branch devices, hubs, docks, retimer, repeaters, or other devices, (any of which could be multi-stream capable). Under the VESA DisplayPort (DP) Standard (e.g., version 2.0), once a display is up the Main-Link (which carries the video data) has only one state: active and fully powered up. With advancements in display panel technologies such as Adaptive Refresh Panels (ARP), Adaptive Sync (AS) Panels, and Panel Replay (PR), significant power savings benefits may be obtained by allowing the Main-Link to be turned off between active frame transmissions.

Various embodiments of the present disclosure provide advanced link power management over the entire display topology for external DisplayPort configurations. Such management may include low latency entry and exit mechanisms into and from low power states of the Main-Link, allowing for the Main-Link to be turned off during the vertical blanking period. The source device may transmit a power down signal (e.g., a specific pattern or packet) on the Main-Link that indicates the Main-Link is transitioning to a low power state. In response, the source device, intermediate devices, and sink devices may manage their power states, e.g., transitioning into low power states locally after the indication is received. In various embodiments, multiple power management states may be defined, where each state is associated with a different exit latency. The power states and associated exit latency requirements would govern the resources (e.g., renderer, CPU, GPU on the source device; branch devices; retimers; circuitry that keeps the Main-Link up and tracking on the sink device, etc.), that could be powered down in the various devices in the DisplayPort topology. As just one example, two Main-Link states could be defined: a sleep state with a longer exit latency and a standby state with a shorter exit latency requirement. In some embodiments, the power down signal may be transmitted a minimum number of times (e.g., four times) for robustness.

Various embodiments may provide significant power savings benefits in Adaptive Refresh and Adaptive Sync panels. For example, in some embodiments in which a display sink utilizes Adaptive Refresh with a range of 60 Hz-1 Hz, a Main-Link may be active only 1.67% of the time in idle workloads. In other embodiments in which a display sink utilizes Adaptive Sync with a range of 120 Hz-20 Hz, a Main-Link may be active only 16.6% of the time. When the Main-Link is not active, it may be powered down according to various embodiments described herein (rather than transmitting blank pixel data or other symbols such as scrambled zeros with periodic control characters as may be done when the link remains active but there are no changes in the display data). As one example, a display may be Adaptive Sync capable and may operate at any refresh rate between a minimum frequency (e.g., 24 Hz) and a maximum frequency (e.g., 144 Hz). In this example, pixel data may be burst to the display at the 144 HZ pixel clock (~7 ms) followed by a long vertical blanking time of ~35 ms (corresponding to a 24 Hz refresh rate). During the vertical blanking time, the Main-Link may be turned off. In embodiments in which a display sink utilizes Panel Replay, the Main-Link may be power managed over the display topology when there is no frame transmitted. Various embodiments may be used with native DP connectors, DP Alt Mode over Universal Serial Bus (USB) Type-C, and DP tunneled over USB, or other suitable DP transport technologies.

Display 102 may be any suitable display device (e.g., a computer monitor, television, etc.) that may couple to a video source device (e.g., 104) to display a representation of a video signal received from the video source device.

In the embodiment depicted, display 102 comprises a scaler chip 108, a display driver 110, a panel 114, and a memory 116. Other embodiments may include a display with any suitable combination of components (including any of those shown or other components).

Scaler chip 108 includes DisplayPort receiver (DPRX) 118, port input selector 120, image processor 122, timing controller (TCON) interface 124, backlight controller 126, central processing unit (CPU) 128, and memory controller 130.

DPRX 118 may comprise circuitry to receive incoming DP data communicated on the Main-Link as well as a transceiver circuit for the auxiliary channel (AUX_CH) of link 106B. The DPRX 118 may implement both PHY and Link Layer functions.

Port input selector 120 is operable to select a port from among a plurality of ports of the display 102 and to pass a video signal received through the port to a processing pipeline of the display 102. The port input selector 120 may include a port interface that comprises or is coupled to a plurality of ports of the display. The display 102 may include any number of ports of any type. For example, display 102 may include a DisplayPort™ port, a High-Definition Multimedia Interface (HDMI™) port, a Universal Serial Bus (USB) port, a Digital Visual Interface (DVI) port, a Video Graphics Array (VGA) port, or other suitable port. Display 102 may include any suitable combination of ports, including multiple ports of the same type or multiple ports of different types. The port input selector 120 may include selection logic coupled to the port interface to select a particular port and to pass the signal received through the particular port on to additional logic (e.g., the image processor 122, etc.). In some embodiments, the port input selector 120 may also include conversion logic to receive a signal from any of the ports of the display 102 and convert the signal to a common format (e.g., a digital pixel format) for further processing.

Image processor 122 may receive a video signal from the port input selector 120 and perform further processing on the video signal. In some embodiments, the image processor 122 may execute one or more algorithms to improve the image quality of the video signal. For example, image processor 122 may perform resolution upscaling, contrast adjustment, color adjustment, or other suitable image processing. In some embodiments, image processor 122 may superimpose one or more images (e.g., a user menu of the display 102) on the video signal.

TCON interface 124 may receive a processed signal from image processor 122 and convert the signal to a format (e.g., a serial high speed interface format such as Embedded DisplayPort™ (eDP) or V-by-One®) compatible with a TCON of the display driver 110.

Backlight controller 126 may include a backlight driver and may generate signals that may be used by the backlight driver to produce current to light up the panel 114.

CPU 128 may provide various functions of the display 102. For example, the CPU 128 may manage the on screen display and user configuration adjustments of the display 102. The CPU 128 may communicate with other components of the display 102 (e.g., to bring up a menu or change the brightness of the display in response to a user selection).

Memory controller 130 may control the transfer of data between one or more components of the scaler chip 108 and the memory 116. Memory 116 may include any suitable volatile or non-volatile memory to support the operations of the display 102. For example, the memory 116 may be used to store instructions executed by the components (e.g., CPU 128, standby controller 118, image processor 122, or other component), frame data (e.g., values of pixels), on-screen display data, or other suitable data. In some embodiments, memory 116 may comprise multiple different memory modules (e.g., each of which may be dedicated to particular types of data) located on any one or more components of the display 102. For example, in various embodiments, the scaler chip 108 may include one or more memory modules to support the operation of the scaler chip 108.

Display driver 110 may comprise circuitry to receive a video signal and to drive electrical signals to the display elements of the panel 114 to cause the panel 114 to display the video. In a particular embodiment, display driver may comprise a TCON. In a particular embodiment, display driver 110 comprises one or more row and column drivers to drive the display elements. The display driver 110 may include one or more digital to analog converters (DACs) to produce the appropriate currents to drive the display elements.

In various embodiments, panel 114 may generate light or allow for the transmission of light in a plurality of pixels. Panel 114 may comprise a display substrate on which a plurality of pixels are located. The pixels define a display area within which a video signal comprising still images, videos, or other content defined by a video signal can be displayed. Panel 114 may utilize any suitable display technology, such as, e.g., a thin-film-transistor liquid crystal display (TFT LCD), micro-light emitting diode (micro-LED), organic LED (OLED), quantum dot LED (QLED), or other suitable display technology.

Any suitable component of the display 102 may comprise circuitry to buffer video data received via link 106B. Such circuitry may include any suitable storage elements, such as latches, flip flops, registers, or other suitable memory.

The components of the display 102 may be arranged in any suitable manner In one embodiment, a first printed circuit board may comprise the scaler chip 108 and a second printed circuit board may comprise the display driver 110 (in some embodiments a separate printed circuit board may house the TCON). In some embodiments, memory 116 or a portion thereof may be included on the first printed circuit board (or integrated on the scaler chip 108).

Video source device 104 may be any suitable computing device to communicate a video signal to the display 102. For example, video source device 104 may be a desktop computing system, a laptop computing system, a server computing system, a storage system, a handheld device, a tablet, or other suitable computing device.

In the embodiment depicted, video source device 104 comprises processor 132, operating system 136 (which may be executed by processor 132), memory 140, I/O controller 142, and graphics processing unit (GPU) 144. Processor 132 is depicted as including two processing cores 134A and 134B, though the processor 132 may include any suitable number of cores.

The operating system 136 may execute a display driver 138 that controls the connection (comprised of the individual connections such as 106A and 106B) from the video source device 104 to the display 102 and the communication of the video signal (and supporting communications) over the connection.

The GPU 144 may generate the video signal that is communicated to the display 102. In the embodiment depicted, the GPU 144 is a discrete component, though in other embodiments, the GPU 144 may be integrated with processor 132.

Memory 140 may include any suitable volatile or non-volatile memory to support the operations of the display 102. The memory 140 may be used to store instructions executed by the components (e.g., processor 132 or GPU 144), or other suitable data. In some embodiments, memory 140 may comprise multiple different memory modules (e.g., each of which may be dedicated to particular types of data) located on any one or more components of the display video source device 104. In some embodiments, memory 140 may comprise a system memory.

I/O controller 142 may comprise circuitry to allow the video source device 104 to communicate with other devices, such as display 102. In the embodiment depicted, I/O controller 142 includes DPTX 146. DPTX 146 may comprise circuitry to transmit outgoing DP data on the Main-Link as well as a transceiver circuit for the AUX_CH of link 106A. The DPTX 146 may implement both PHY and Link Layer functions. In various embodiments, the I/O controller 142 may comprise circuitry to buffer video data to be sent via link 106A. Such circuitry may include any suitable storage elements, such as latches, flip flops, registers, or other suitable memory.

The display topology may include a source device (e.g., 104), one or more sink devices (e.g., displays 102), and one or more intermediate devices 103 placed between the video source device and the one or more video sink devices (e.g., data sent from the source device to the sink device passes through each intermediate device). An intermediate device 103 may include a branch device, hub, dock, retimer, repeater, or other suitable device that may function as both a DisplayPort sink and source to manipulate and/or redrive the video signal as it travels to the final sink device (e.g., display 102). An intermediate device 103 may include circuitry that may be placed in a low power state responsive to a power down signal from a video source device. In some embodiments, different sets of circuitry of an intermediate device 103 may be turned off depending on the type of power down signal received. In some embodiments, an intermediate device 103 comprises a DPRX and a DPTX (such as that described above). Any suitable number and combination of intermediate devices 103 may be present between a video source device and a video sink device.

As one example, an intermediate device 103 may comprise a link training-tunable PHY repeater (LTTPR). In general, a device that only includes the PHY Layer circuit of a DPRX and DPTX may be referred to as a PHY Repeater. In some embodiments, multiple LTTPRs may be placed between a source device and a sink device. As another example, an intermediate device 103 may comprise a retimer, which may be, e.g., a PHY Repeater with a retimer data path. As another example, an intermediate device 103 could include a branch device. A branch device may be connected between the video source device 104 and the display 102 (or may be located on the video source device 104 itself in the communication path after a video signal generated by the device 104 but before the video signal leaves the device 104). For example, in some embodiments, the video source device 104 may multiplex multiple video signals together (e.g., using Multi-Stream Transport as defined in a DisplayPort™ standard) and send the multiplexed video signals to a branch device. The branch device may then demultiplex the combined signals into their original video signals and provide the original video signals to input ports of one or more displays.

A link 106 (e.g., 106A or 106B) may comprise any suitable transmission medium operable to communicate analog or digital data between any two or more of the display 102, an intermediate device 103, and the video source device 104. In some embodiments, a link 106 may comprise a cable with a connector on each end. In other embodiments, a link 106 may comprise conductive tracing on a printed circuit board.

A link 106 may include a Main-Link which, at least in some embodiments, may provide a unidirectional channel for isochronous stream transport. In various embodiments, a Main-Link may comprise one, two, or four differential pairs (wherein each differential pair is referred to as a lane) for communication between a source device and a sink device. The Main-Link may carry the video signal. In various embodiments, the Main-Link may support one or more of the following bit rates: Ultra High Bit Rate 20 (UHBR20) at 20 Gbps/lane, UHBR13.5 at 13.5 Gbps/lane, UHBR10 at 10 Gbps/lane, High Bit Rate 3 (HBR3) at 8.1 Gbps/lane, HBR2 at 5.4 Gbps/lane, HBR at 2.7 Gbps/lane, Low or Reducted Bit Rate (RBR) at 1.62 Gbps/lane, or other suitable bit rate. In various embodiments, the Main-Link may transport data encoded using a channel encoding such as 128b/132b channel encoding (e.g., used with any of the UHBR bit rates listed above), 8b/10b channel encoding (e.g., used with the HBR and RBR bit rates listed above), or other suitable channel encoding.

A link 106 may also include an auxiliary channel (AUX_CH). In at least some embodiments, the AUX_CH is a half-duplex, bidirectional channel with one differential pair transporting data (e.g., control data). The AUX_CH may have a bit rate of 1 Mbps or other suitable bit rate. The AUX_CH may be a sideband channel that does not carry the video signal and/or a channel that is used for capability discovery, link configuration, and error troubleshooting (e.g., reading status information of the display 102 when an error is detected via a hot plug detection pin of the connection). As just one example, the AUX_CH may be used by the video source device 104 to read an Extended Display Identification Data (EDID) (a data structure that describes the capabilities of the display, such as the manufacturer, serial number, supported resolutions, refresh rates, clock speeds, color spaces, etc.) of the display 102 at the time of establishment of the virtual channel to the display 102. In various embodiments, the AUX_CH may communicate data without being trained, whereas the Main-Link may require training before carrying the video signal.

Figure 2:
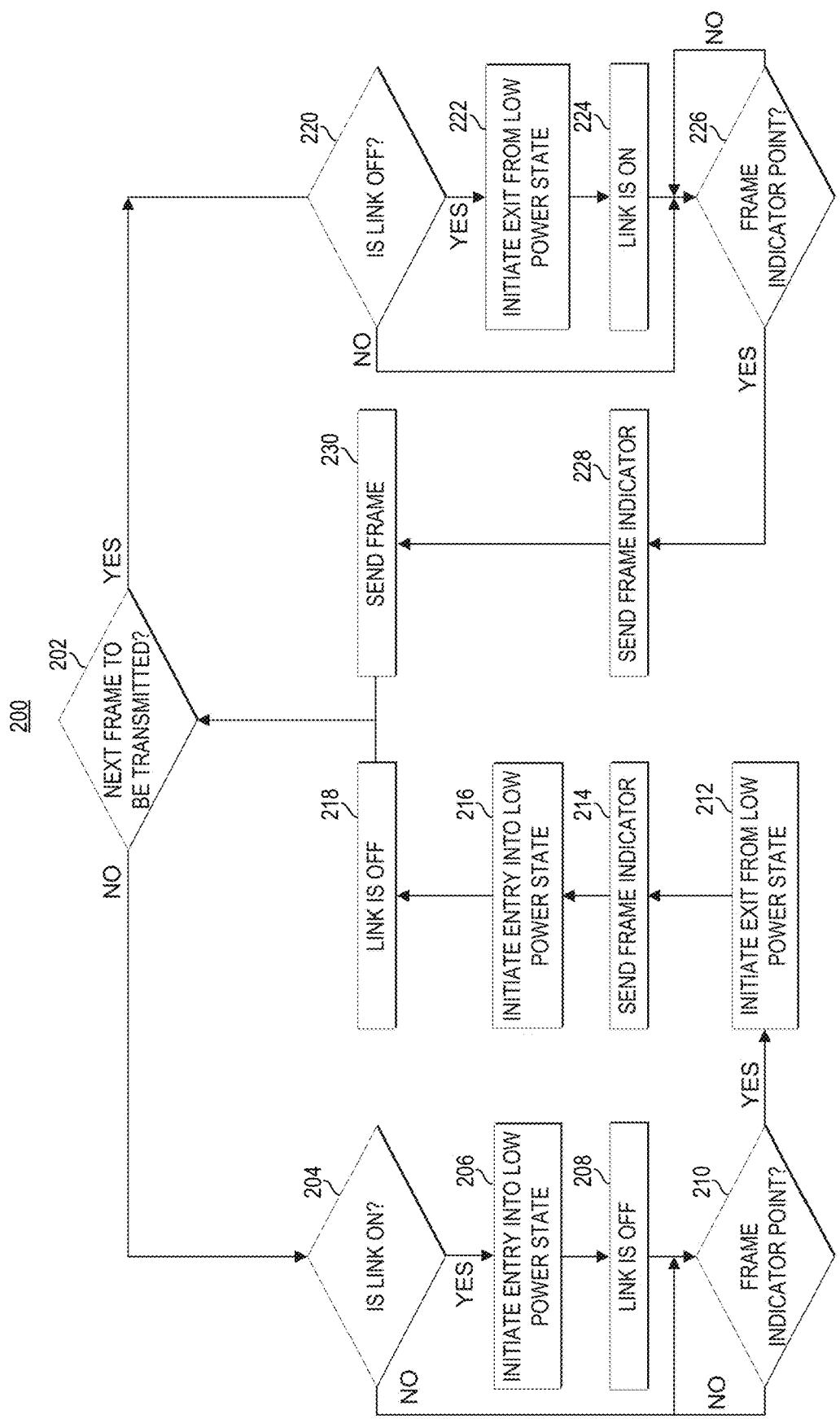
FIG. 2 illustrates a flow for advanced link power management in accordance with certain embodiments.

FIG. 2 illustrates a flow 200 for advanced link power management in accordance with certain embodiments. The flow depicts operations that may be performed by any suitable logic of a source device (e.g., 104). At 202, a determination is made as to whether a next frame (e.g., a frame including video data) is to be transmitted over a Main-Link. If a next frame is not to be transmitted, a determination is made as to whether the Main-Link is on at 204. If the Main-Link is off, the flow moves to 210. If the Main-Link is on, then the source device initiates an entry into a low power state at 206. This may include transmitting a power down signal on the Main-Link towards the sink device. At 208, the Main-Link is turned off (or otherwise placed into a low power state). This may include coupling each of the differential pairs of the Main-Link to a common voltage (e.g., a common mode voltage), transitioning the differential pairs to a high impedance state in which the differential pairs are not driven, or otherwise transitioning the Main-Link to a state in which video data is not transferred and power is thereby reserved.

At 210, a determination is made as to whether a frame indicator point has been reached. In various embodiments, whether the frame indicator point has been reached is based on a timer (which may be based, e.g., on the refresh rate of the display 102). If a frame indicator point has not been reached, the flow remains at 210 until a frame indicator point has been reached. The flow then moves to 212, where an exit from low power state is initiated. This exit may be initiated in any suitable manner (e.g., by sending a wakeup signal) and will be discussed in more detail in connection with FIG. 5. At 214, the frame indicator is sent. At 216, the source again initiates an entry into a low power state (e.g., by sending a power down signal) and the link is turned off at 218.

If it is instead determined at 202 that a frame is ready to be transmitted, the flow moves to 220 where a determination as to whether the Main-Link is off is made. If the Main-Link is on, then the flow moves to 226. If the Main-Link is off, the flow moves to 222, where an exit from the low power state is initiated. The Main-Link is then turned on at 224 and the flow moves to 226.

At 226, a determination is made as to whether a frame indicator point has been reached. If a frame indicator point has not been reached, the flow remains at 226 until a frame indicator point is to be sent. The flow then moves to 228, where the frame indicator is sent. At 230, the frame is sent over the Main-Link and the flow returns to 202. In some embodiments, the frame indicator may be sent along with the frame. More details regarding the frame indicator is described in connection with FIG. 6.

FIG. 3 illustrates a table 300 of example power down signal sequences in accordance with certain embodiments. A power down signal (such as one depicted or other suitable power down signal having a different sequence) may be sent by a source device to a sink device to initiate entry into the low power state before the Main-Link is shut off (e.g., at 206 or 216). The table 300 depicts a first type of power down signals 302 and 306 (e.g., an ML_PHY_SLEEP pattern) that may be used to initiate a first low power state (e.g., a sleep state) and a second type of power down signals 304 and 308 (e.g., an ML_PHY_STANDBY pattern) that may be used to initiate a second low power state (e.g., a standby state). As described earlier, the different low power states may have different exit latency requirements (e.g., the standby state may require a quicker wakeup from the low power state than the sleep state). In other embodiments, any suitable number of low power states (with their own latency requirements and sequences) may be used.

In the embodiment depicted, the power down signals 302 and 304 represent power down signals that may be used for RBR and HBR operation modes in which the channel encoding is 8b/10b. The sequences shown for power down signals 302 and 304 are the same sequences used in the eDP standard for link management operations. In other embodiments, different sequences may be used. In general, when 8b/10b encoding is used, the sequence may include valid symbols and adequate disparity (e.g., an adequate number of ones and zeros) across the sequence.

In the embodiment depicted, the power down signals 306 and 308 represent power down signals that may be used for UHBR operation modes in which the channel encoding is 128b/132b. Each sequence may Control Data Indicator (CDI) bits as well as additional bits. In at least some embodiments, the sequences are not scrambled. The sequences shown in the table omit pre-coding (while during actual transmission pre-coding may be applied in order to maintain DC balance).

Figure 4:
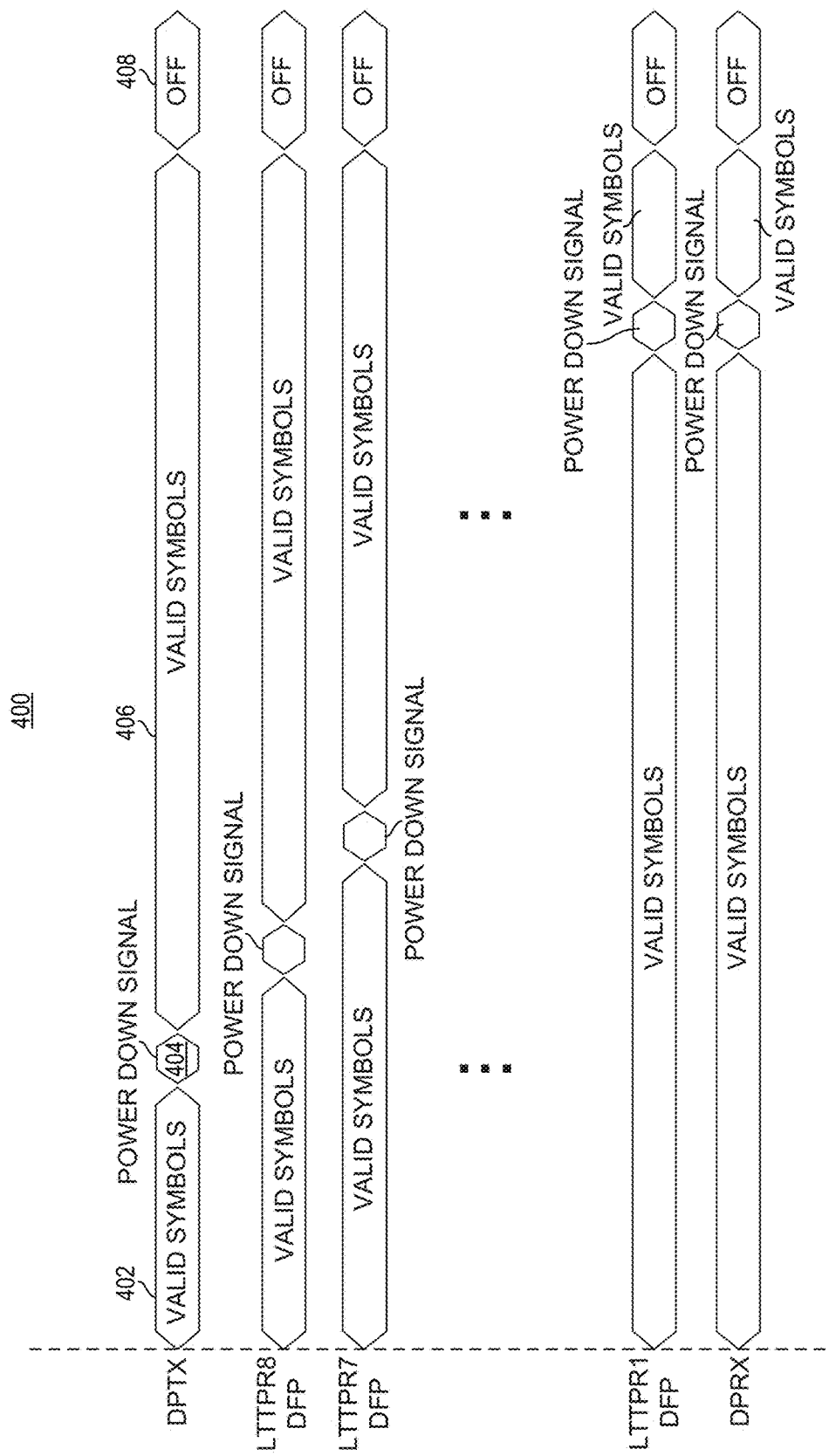
FIG. 4 illustrates a propagation of a power down signal in accordance with certain embodiments.

FIG. 4 illustrates a graph 400 of a propagation of a power down signal 404 through a DisplayLink topology in accordance with certain embodiments. In the embodiment depicted, the power down signal traverses through eight intermediate devices (depicted as LTTPRs) between a DPTX of a source device (e.g., video source device 104) and a DPRX of a sink device (e.g., display 102). In the graph 400, the timing of the signaling is shown for the downstream facing ports (DFPs) of the LTTPRs.

Prior to transmitting the power down signal at 404, the source device may transmit any suitable valid symbols at 402. For example, the source device may transmit idle symbols (in which A/V data is not included) or data symbols (in which A/V data is included) at 402 before the power down signal is sent at 404. The symbols transmitted at 402 may be transmitted using any suitable mode, such as Single-Stream Transport (SST) and Multi-Stream Transport (MST) or in a Link Layer Control Packet (LLCP). All the devices in the topology would decode the power down signal and react accordingly (e.g., by turning off resources based on the type of power down state specified by the power down signal, where in some devices more resources may be powered down when the wakeup latency associated with the type of power down signal is longer). Since there may be multiple devices in the display topology, the source device may continue to transmit valid symbols (e.g., data symbols or idle symbols) at 406 on the Main-Link until all the devices in the topology have decoded the power down signal and taken appropriate action.

In various embodiments, the source device may be aware of the entire DP topology and thus may be able to estimate the amount of time that will expire before the sink device receives the power down signal. For example, the source may continue to transmit any valid symbol pattern for at least 1 us for every device in the topology to ensure that the devices have the recovered clock for a duration after the transmission of the power down signal. For example, in a topology with eight LTTPRs, the source device may transmit valid symbols for 8 us after transmitting the power down signal to ensure that all of the LTTPRs have the recovered clock long enough to take appropriate action. The valid symbols may be used to recover the clocks in the intermediate devices and the DPRX in order to decode the power down signal 404 (e.g., the ML_PHY_SLEEP pattern) and take the appropriate action of turning off the Main-Link. In various embodiments, the clocks throughout the topology may be maintained until the last device in the topology (e.g., the DPRX) receives the power down signal 404 (e.g., each intermediate device may be aware of the number of devices downstream of the respective device and thus may know when it can turn off) and then all of the devices may turn off (e.g., simultaneously). Thus, after transmitting the valid symbols for a period of time the Main-Link is turned off at 408. While the Main-Link is off, no data is driven across the Main-Link. For example, the differential pairs of the Main-Link may be coupled to a common mode voltage or may be placed in a high impedance state.

Figure 5:
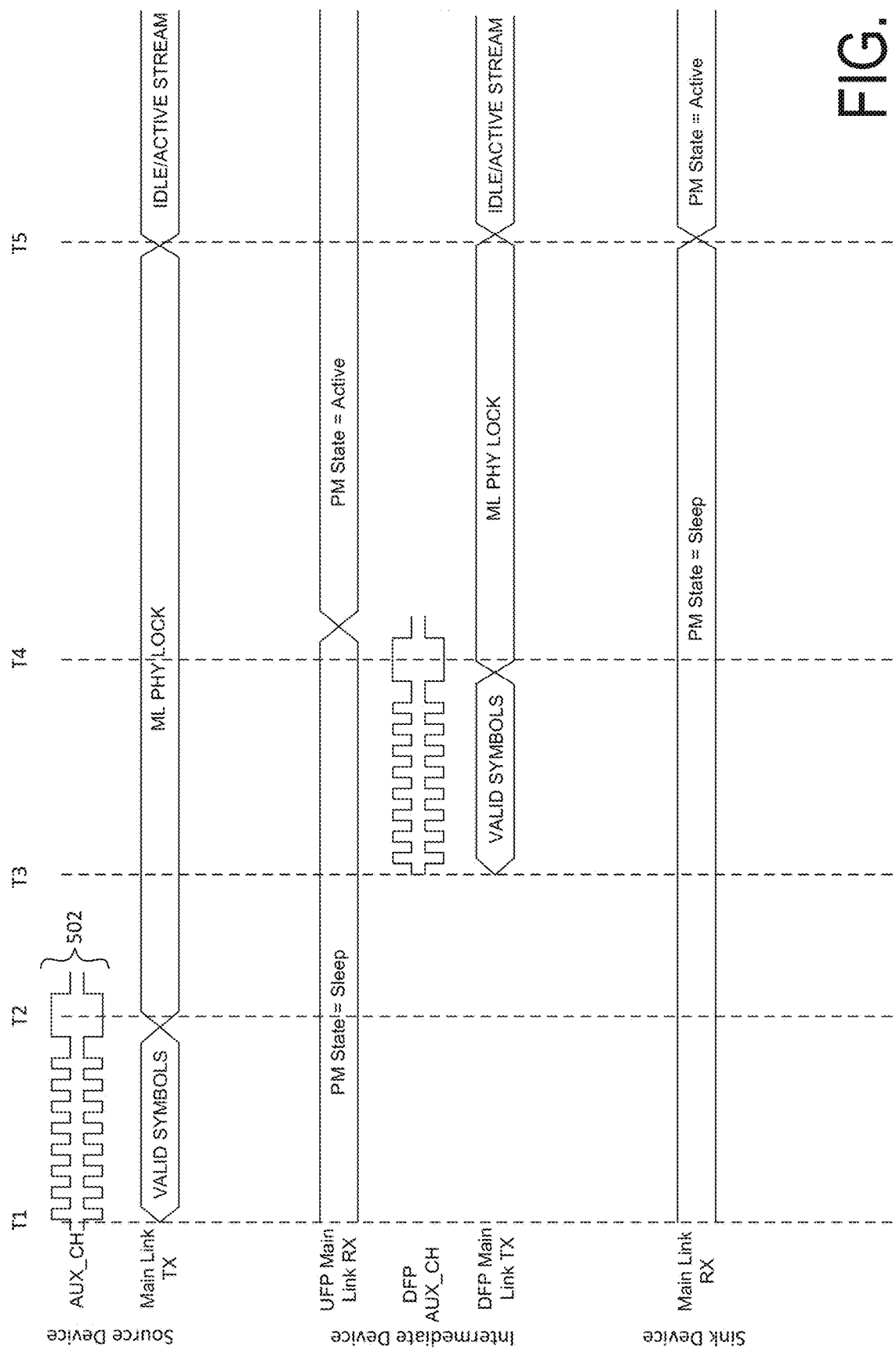
FIG. 5 illustrates a signal propagation of a wakeup signal in accordance with certain embodiments.

FIG. 5 illustrates a signal propagation of a wakeup signal sequence 502 in accordance with certain embodiments. While the DisplayPort standards specify a DisplayPort Configuration Data (DPCD) write over the AUX_CH to indicate to the sink device that the Main-Link is being turned on, this mechanism has a significant latency overhead and cannot be used for dynamic management of the link while displaying on an external display device.

In a first embodiment, reactivation of the Main-Link is initiated using squelch detection on the Main-Link. During squelch detection, a low frequency signal is toggled on the Main-Link. Each receiver (e.g., the sink device and any intermediate devices 103) is in a powered down state, but is operable to sense a predetermined sequence of low frequency pulses sent over the Main-Link (where the frequency is lower than the frequency used to send the video data). Once each receiver detects the low frequency signal, it exits its low power state and prepares to receive additional data over the Main-Link. Once the low frequency signal has been sent for an adequate time period, the source device may send a signal (e.g., a ML_PHY_LOCK as defined in the eDP standard or variation thereof) that allows each receiver to recover the clock and then may send valid data over the Main-Link.

In a second embodiment, a simplified wake mechanism over the AUX_CH is used to initiate the reactivation of the Main-Link. This mechanism may be based on the AUX_PHY_WAKE mechanism that is used for point-to-point inside the box eDP connections and may be extended for use with external displays. An example flow for the simplified wake mechanism over the AUX_CH is depicted in FIG. 5.

At time 1 (T1), a DP source device (e.g., video source device 104) issues an AUX_PHY_WAKE signal 502 over the AUX_CH to initiate a wakeup from the low power state. In contrast to the squelch mechanism described above, in this case the receivers in the DP topology can completely power down the circuitry for the Main-Link and instead monitor the AUX_CH. The AUX_PHY_WAKE signal may be independent of the current link state and indicates an exit into a Main-Link active state. The AUX_PHY_WAKE signal includes a preamble (8 zeros), followed by a 2-bit period low, then a 2-bit period high, then a stop condition (with a 2-bit period high and a 2-bit period low).

At T2, after transmitting the AUX_PHY_WAKE signal (e.g., at the time the stop condition is transmitted on the AUX_CH), the source device transmits an ML_PHY_LOCK signal over the Main-Link. In various embodiments, ML_PHY_LOCK may include a link training pattern sequence (e.g., TPS2) that includes a short pattern repeated multiple times. When 128b_132b encoding is enabled, the ML_PHY_LOCK may include a 4-bit CDI field inserted into the pattern. During transmission of the ML_PHY_LOCK sequence, a PHY sync symbol may be transmitted once every 96 codes (e.g., when 128b_132b encoding is used). The ML_PHY_LOCK sequence may begin with an LT_SCRAMBLER_RESET PHY sync symbol. Subsequently, every fourth PHY_SYNC_ONLY PHY sync symbol is replaced with an LT_SCRAMBLER_RESET PHY sync symbol. The ML_PHY_LOCK sequence ends with a POST_LT_SCRAMBLER_RESET PHY sync symbol, which replaces the PHY_SYNC_ONLY PHY or LT_SCRAMBLER_RESET PHY sync symbol.

Concurrently with or close in time to the transmission of ML_PHY_LOCK at T2, an intermediate node 103 (e.g., an LTTPR) that is connected to the DP source device detects the AUX_PHY_WAKE signal on the AUX_CH. In response, the intermediate device initiates a PLL lock sequence (utilizing the ML_PHY_LOCK signal) and enables the Main-Link.

At T3, the intermediate device is up and running in an active state and will issue the AUX_PHY_WAKE indication on its downstream facing port (DFP) to the sink device (e.g., display 102). At T4, the sink device will begin its exit sequence. At T5, the sink device is out of its low power state. Although not shown, the sink device may issue an AUX_PHY_WAKE_ACK indication back towards the source. When this sequence is received by the intermediate device, it forwards the AUX_PHY_WAKE_ACK to the connected upstream source device. When the source device receives the AUX_PHY_WAKE_ACK, it knows that all devices over the topology have exited low power states and are ready to receive data over the Main-Link. In an alternative embodiments, rather than waiting for the handshaking signal AUX_PHY_WAKE_ACK, the source may wait for an expected amount of time for all devices in the topology to wake up before starting active symbol transmission. Once the AUX_PHY_WAKE_ACK symbol is received or the prescribed amount of time has passed, the DP source device may send idle symbols or an active stream over the Main-Link.

Figure 6:
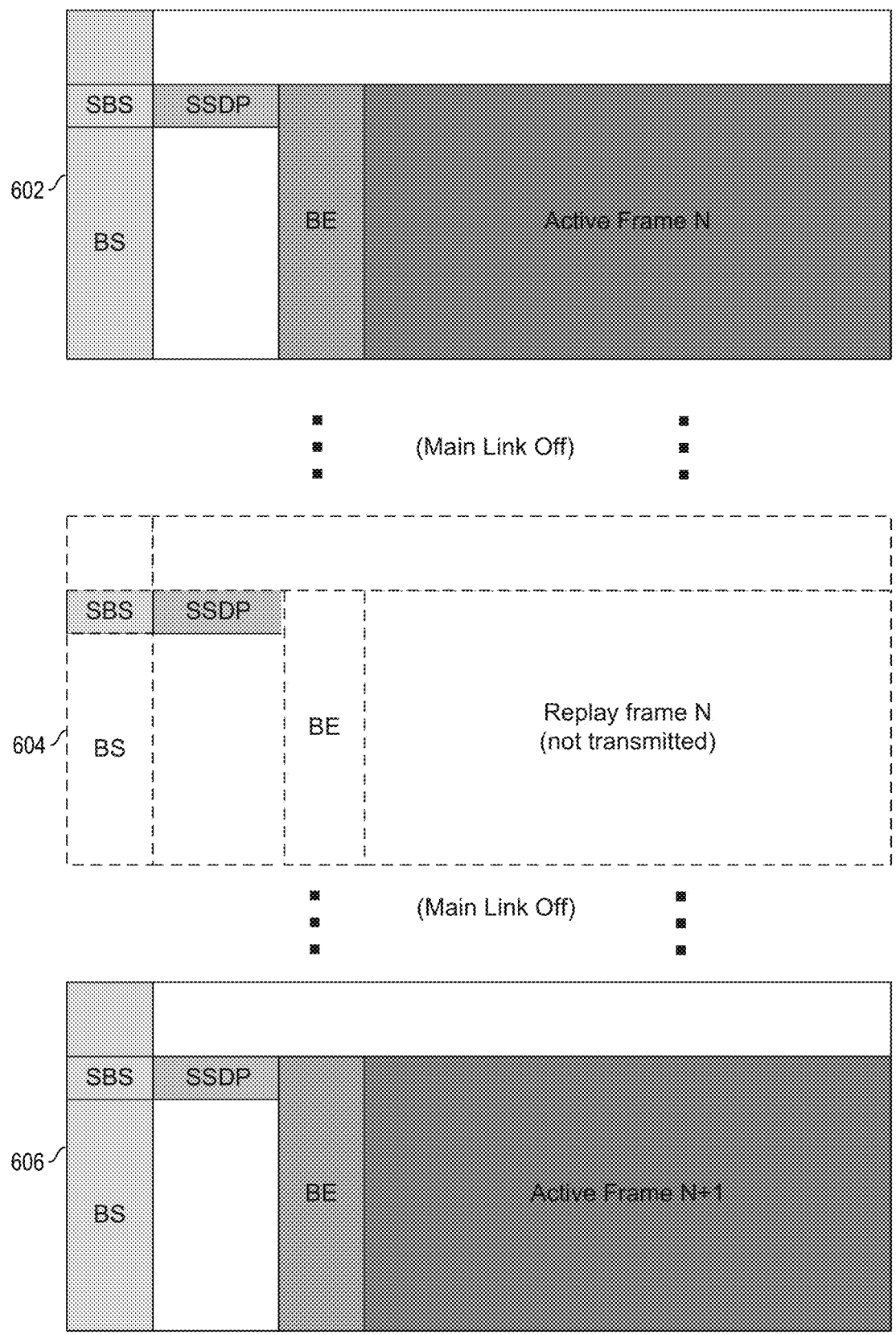
FIG. 6 illustrates a frame indicator in accordance with certain embodiments.

FIG. 6 illustrates a frame indicator in accordance with certain embodiments. Drift occurs when both the source device and the sink device are powered down (e.g., because a PLL of the sink device isn't able to use the recovered clock sent from the source device as its reference clock to stay in synchronization with the source device). Thus, while the Main-Link is in a low power state, if a quick recovery from the low power state is desired, frame timing synchronization must be maintained between the source device and the sink device. This may be achieved via sending a frame indicator every frame (or every N frames) even when there is no active frame transmission.

In one embodiment, the frame indicator may be a global time code (GTC) that is sent periodically by the source device over the AUX_CH link. The global time code may indicate a time tracked at the source device. The sink device may receive the GTC and compare it with its own GTC to adjust synchronization. The advantage of such an embodiment is the Main-Link can stay off during transmission of the GTC.

In another embodiment, a frame indicator may be sent from the source device to the sink device periodically on the Main-Link. The frame indicator may be located in any suitable predefined position within the frame. In one embodiment, the frame indicator may be a special blank start depicted in FIG. 6 as a synchronization blank start (SBS). The SBS may be sent on the first line of active data (as in the depicted embodiment) or other predefined position. In another embodiment, the frame indicator may be a special secondary data packet depicted in FIG. 6 as a synchronization secondary data packet (SSDP). In other embodiments, both the SBS and the SSDP may be used together as the frame indicator. In yet other embodiments, any other suitable one or more signals or packets which has a fixed position in the display stream relative to the start of the active period of the frame may be used as the frame indicator.

In the embodiment depicted, three frames 602, 604, and 606 are depicted. In between the transmission of each of these frames, the Main-Link is turned off. Thus, the transmission of each packet may be preceded by an exit from low power state and followed by a re-entry into the low power state in which the Main-Link is turned off (e.g., according to any of the procedures described above). Each of the frames 602, 604, and 606 include a depiction of both the SBS and the SSDP (although in some embodiments only one of these signals is sent with the frame).

In the first frame 602, the SBS and the SSDP is on the first line of active video data (although in other embodiments either of these signals could be on a different line as long as the source device and the sink device are both aware of which line the signal is to be sent, the time between the frame indicator and the first active line may be pre-negotiated between the source and the sink device and may be a fixed amount of time). In the second frame 604, the SBS and the SSDP are in the same position, although active data is not sent (as frame 604 is a replay frame). In the last frame 606, the SBS and the SSDP are again on the first line of active data (thus, if these frames represent received frames by the sink device, no drift has occurred since the frame indicator was received at the expected time in each frame).

If an SBS is used as the frame indicator, the SBS may occur at a position that aligns with other blank start (BS) signals transmitted in the frame (shown in the same column of the frames in the embodiment depicted). If an SSDP is used, the SSDP may occur within the vertical blanking region of the frame or the horizontal blanking region of the frame (e.g., in between a BS and a blank end (BE) signal).

Thus, the frame indicator may utilize the start of the frame (e.g., the first active line) as a reference of time. In various embodiments, the source and sink negotiate (or are configured to expect) some other time at which the frame indicator will be sent. For example, the frame indicator may be placed 5 lines before the first active line. In this example, if the sink device receives the frame indicator at 6 lines before the first active line then it will correct for the one line drift. Such embodiments maintain a reference of time while also allowing for adjustments to the vertical blanking period if needed. By varying the vertical blanking period, the refresh rate may be changed even when a frame is not being sent.

Although FIG. 6 depicts an embodiment in which the SSDP and SBS is transmitted every frame. In other embodiments, the frame indicator may be transmitted once every N frames, where N is any suitable integer number of frames.

The flows and graphs described herein are merely representative of operations or communications that may occur in particular embodiments. In other embodiments, additional operations or communications may be performed in the flows. Various embodiments of the present disclosure contemplate any suitable signaling mechanisms for accomplishing the functions described herein. Some of the operations illustrated in the FIGs. may be repeated, combined, modified, or deleted where appropriate. Additionally, operations may be performed in any suitable order without departing from the scope of particular embodiments.

Figure 7:
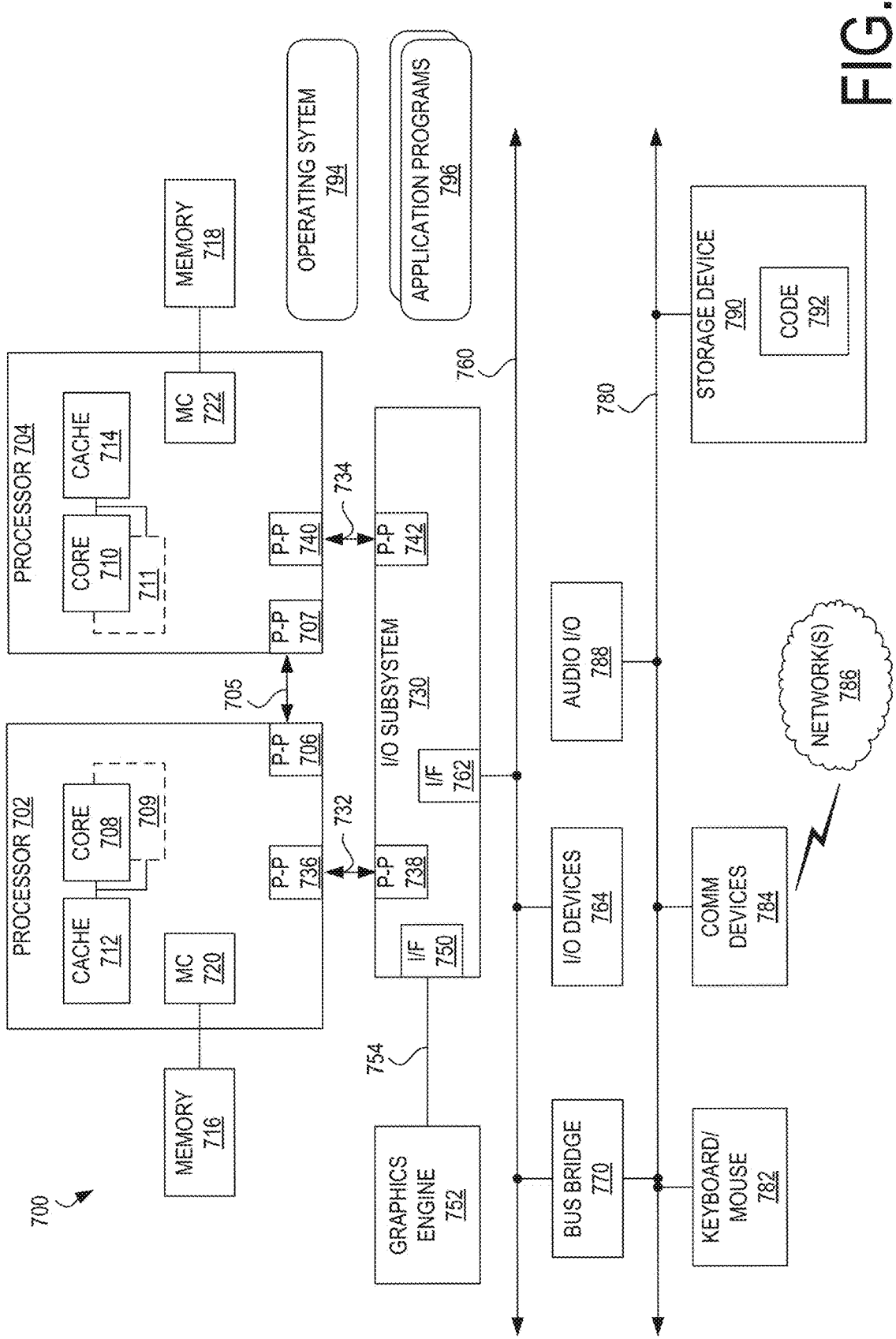
FIG. 7 is a block diagram of a computing system in which technologies described herein may be implemented in accordance with certain embodiments.

FIG. 7 is a block diagram of a computing device in which technologies described herein may be implemented in accordance with certain embodiments (e.g., the video source device 104 may include any of the characteristics or components of the computing device of FIG. 7). The technologies, techniques, and embodiments described herein can be performed by any of a variety of computing devices, including mobile devices (e.g., smartphones, handheld computers, laptops, notebooks, tablets, media players, portable gaming consoles, cameras), non-mobile devices (e.g., desktop computers, servers, stationary gaming consoles, set-top boxes, televisions) and embedded devices (e.g., devices incorporated into a vehicle, home or place of business). As used herein, the term "computing devices" includes computing systems and includes devices comprising multiple discrete physical components.

FIG. 7 is a block diagram of an exemplary computing device in which technologies described herein may be implemented. Generally, components shown in FIG. 7 can communicate with other shown components, although not all connections are shown, for ease of illustration. The device 700 is a multiprocessor system comprising a first processor 702 and a second processor 704 and is illustrated as comprising point-to-point (P-P) interconnects. For example, a point-to-point (P-P) interface 706 of the processor 702 is coupled to a point-to-point interface 707 of the processor 704 via a point-to-point interconnection 705. It is to be understood that any or all of the point-to-point interconnects illustrated in FIG. 7 can be alternatively implemented as a multi-drop bus, and that any or all buses illustrated in FIG. 7 could be replaced by point-to-point interconnects.

As shown in FIG. 7, the processors 702 and 704 are multicore processors. Processor 702 comprises processor cores 708 and 709, and processor 704 comprises processor cores 710 and 711. Processor cores 708-711 can execute computer-executable instructions in a manner similar to that discussed below in connection with FIG. 8, or in other manners.

Processors 702 and 704 further comprise at least one shared cache memory 712 and 714, respectively. The shared caches 712 and 714 can store data (e.g., instructions) utilized by one or more components of the processor, such as the processor cores 708-709 and 710-711. The shared caches 712 and 714 can be part of a memory hierarchy for the device 700. For example, the shared cache 712 can locally store data that is also stored in a memory 716 to allow for faster access to the data by components of the processor 702. In some embodiments, the shared caches 712 and 714 can comprise multiple cache layers, such as level 1 (L1), level 2 (L2), level 3 (L3), level 4 (L4), and/or other caches or cache layers, such as a last level cache (LLC).

Although the device 700 is shown with two processors, the device 700 can comprise any number of processors. Further, a processor can comprise any number of processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 700 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 702 and 704 reside in the same die package.

Processors 702 and 704 further comprise memory controller logic (MC) 720 and 722. As shown in FIG. 7, MCs 720 and 722 control memories 716 and 718 coupled to the processors 702 and 704, respectively. The memories 716 and 718 can comprise various types of memories, such as volatile memory (e.g., dynamic random access memories (DRAM), static random access memory (SRAM)) or non-volatile memory (e.g., flash memory). While MCs 720 and 722 are illustrated as being integrated into the processors 702 and 704, in alternative embodiments, the MCs can be logic external to a processor and can comprise one or more layers of a memory hierarchy.

Processors 702 and 704 are coupled to an Input/Output (I/O) subsystem 730 via P-P interconnections 732 and 734. The point-to-point interconnection 732 connects a point-to-point interface 736 of the processor 702 with a point-to-point interface 738 of the I/O subsystem 730, and the point-to-point interconnection 734 connects a point-to-point interface 740 of the processor 704 with a point-to-point interface 742 of the I/O subsystem 730. Input/Output subsystem 730 further includes an interface 750 to couple I/O subsystem 730 to a graphics engine 752, which can be a high-performance graphics engine. The I/O subsystem 730 and the graphics engine 752 are coupled via a bus 754. Alternately, the bus 754 could be a point-to-point interconnection.

Input/Output subsystem 730 is further coupled to a first bus 760 via an interface 762. The first bus 760 can be a Peripheral Component Interconnect (PCI) bus, a PCI Express bus, another third generation I/O interconnection bus or any other type of bus.

Various I/O devices 764 can be coupled to the first bus 760. A bus bridge 770 can couple the first bus 760 to a second bus 780. In some embodiments, the second bus 780 can be a low pin count (LPC) bus. Various devices can be coupled to the second bus 780 including, for example, a keyboard/mouse 782, audio I/O devices 788 and a storage device 790, such as a hard disk drive, solid-state drive or other storage devices for storing computer-executable instructions (code) 792. The code 792 can comprise computer-executable instructions for performing technologies described herein. Additional components that can be coupled to the second bus 780 include communication device(s) 784, which can provide for communication between the device 700 and one or more wired or wireless networks 786 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 700 can comprise removable memory such as flash memory cards (e.g., SD (Secure Digital) cards), memory sticks, Subscriber Identity Module (SIM) cards). The memory in device 700 (including caches 712 and 714, memories 716 and 718 and storage device 790) can store data and/or computer-executable instructions for executing an operating system 794 and application programs 796. Example data includes web pages, text messages, images, sound files, video data, biometric thresholds for particular users or other data sets to be sent to and/or received from one or more network servers or other devices by the device 700 via one or more wired or wireless networks, or for use by the device 700. The device 700 can also have access to external memory (not shown) such as external hard drives or cloud-based storage.

The operating system 794 can control the allocation and usage of the components illustrated in FIG. 7 and support one or more application programs 796. The application programs 796 can include common mobile computing device applications (e.g., email applications, calendars, contact managers, web browsers, messaging applications) as well as other computing applications and utilities, such as a virtual keyboard.

The device 700 can support various input devices, such as a touchscreen, microphones, camera, physical keyboard, virtual keyboard, proximity sensor and trackball, and one or more output devices, such as a speaker and a display. Other possible input and output devices include piezoelectric and other haptic I/O devices. Any of the input or output devices can be internal to, external to or removably attachable with the device 700. External input and output devices can communicate with the device 700 via wired or wireless connections.

In addition, the computing device 700 can provide one or more natural user interfaces (NUIs). For example, the operating system 794 or applications 796 can comprise speech recognition logic as part of a voice user interface that allows a user to operate the device 700 via voice commands. Further, the device 700 can comprise input devices and logic that allows a user to interact with the device 700 via a body, hand, or face gestures. For example, a user's hand gestures can be detected and interpreted to provide input to a gaming application.

The device 700 can further comprise one or more communication components 784. The components 784 can comprise wireless communication components coupled to one or more antennas to support communication between the device 700 and external devices. The wireless communication components can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 700 can further include at least one input/output port (which can be, for example, a USB, IEEE 1394 (FireWire), Ethernet and/or RS-232 port) comprising physical connectors; a power supply; a satellite navigation system receiver, such as a GPS receiver; a gyroscope; an accelerometer; a proximity sensor; and a compass. A GPS receiver can be coupled to a GPS antenna. The device 700 can further include one or more additional antennas coupled to one or more additional receivers, transmitters and/or transceivers to enable additional functions.

It is to be understood that FIG. 7 illustrates only one exemplary computing device architecture. Computing devices based on alternative architectures can be used to implement technologies described herein. For example, instead of the processors 702 and 704, and the graphics engine 752 being located on discrete integrated circuits, a computing device can comprise an SoC (system-on-a-chip) integrated circuit incorporating multiple processors, a graphics engine and additional components. Further, a computing device can connect elements via bus or point-to-point configurations different from that shown in FIG. 7. Moreover, the illustrated components in FIG. 7 are not required or all-inclusive, as shown components can be removed and other components added in alternative embodiments.

Figure 8:
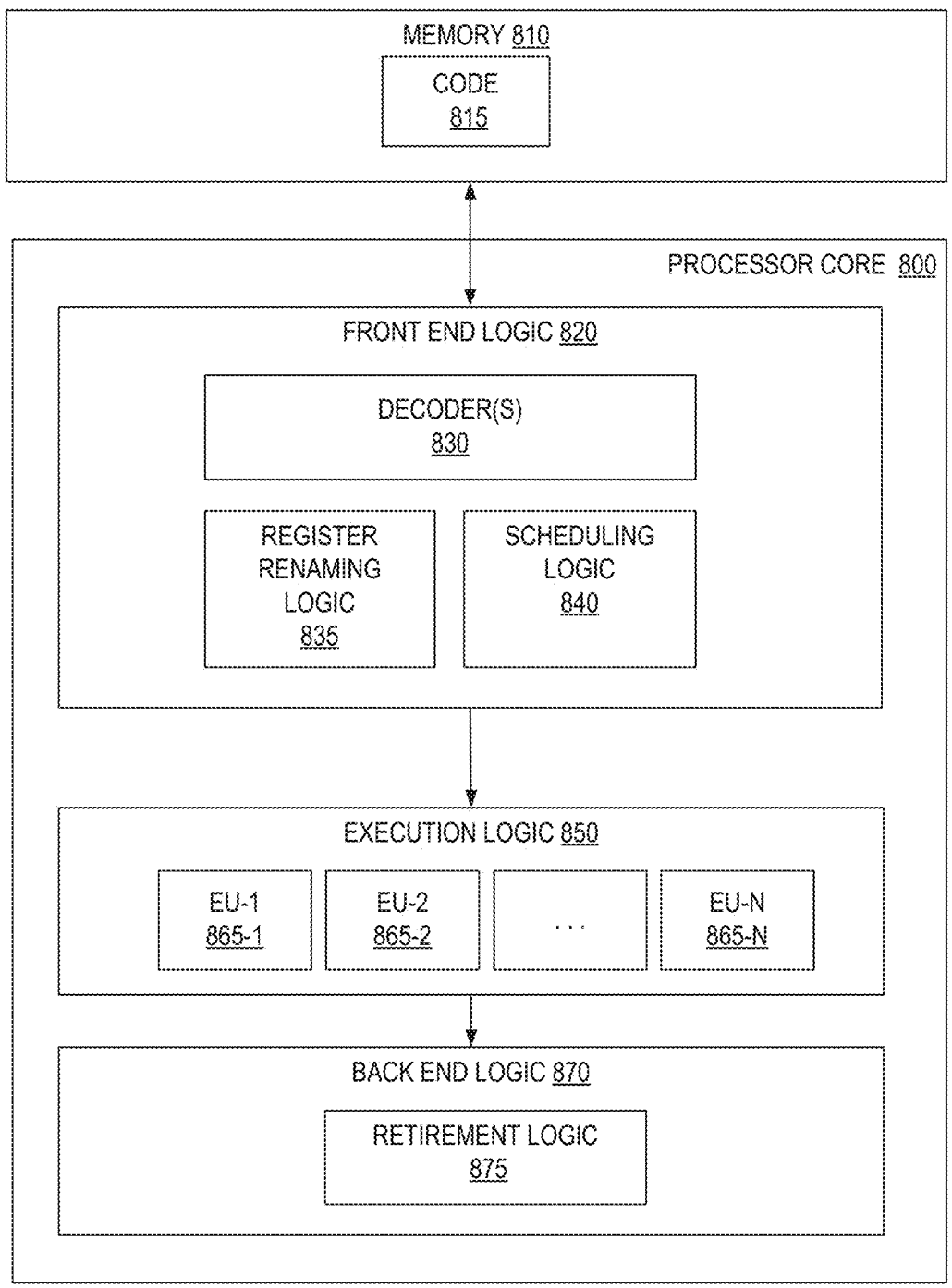
FIG. 8 is a block diagram of an exemplary processor core that can execute instructions as part of implementing technologies described herein in accordance with certain embodiments.

FIG. 8 is a block diagram of an exemplary processor core that can execute instructions as part of implementing technologies described herein in accordance with certain embodiments. The processor core 800 can be a core for any type of processor, such as a microprocessor, an embedded processor, a digital signal processor (DSP) or a network processor. The processor core 800 can be a single-threaded core or a multithreaded core in that it may include more than one hardware thread context (or "logical processor") per core.

FIG. 8 also illustrates a memory 810 coupled to the processor 800. The memory 810 can be any memory described herein or any other memory known to those of skill in the art. The memory 810 can store computer-executable instruction 815 (code) executable by the processor core 800.

The processor core comprises front-end logic 820 that receives instructions from the memory 810. An instruction can be processed by one or more decoders 830. The decoder 830 can generate as its output a micro operation such as a fixed width micro operation in a predefined format, or generate other instructions, microinstructions, or control signals, which reflect the original code instruction. The front-end logic 820 further comprises register renaming logic 835 and scheduling logic 840, which generally allocate resources and queues operations corresponding to converting an instruction for execution.

The processor core 800 further comprises execution logic 850, which comprises one or more execution units (EUs) 865-1 through 865-N. Some processor core embodiments can include a number of execution units dedicated to specific functions or sets of functions. Other embodiments can include only one execution unit or one execution unit that can perform a particular function. The execution logic 850 performs the operations specified by code instructions. After completion of execution of the operations specified by the code instructions, back-end logic 870 retires instructions using retirement logic 875. In some embodiments, the processor core 800 allows out of order execution but requires in-order retirement of instructions. Retirement logic 870 can take a variety of forms as known to those of skill in the art (e.g., re-order buffers or the like).

The processor core 800 is transformed during execution of instructions, at least in terms of the output generated by the decoder 830, hardware registers and tables utilized by the register renaming logic 835, and any registers (not shown) modified by the execution logic 850. Although not illustrated in FIG. 8, a processor can include other elements on an integrated chip with the processor core 800. For example, a processor may include additional elements such as memory control logic, one or more graphics engines, I/O control logic and/or one or more caches.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as intermediate device 103, DPRX 118, DPTX 146, scaler chip 108, display driver 110, panel 114, memory 116, processor 132, operating system 136, memory 140, I/O controller 142, GPU 144, computing device 700, processor core 800, memory 810, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following examples pertain to additional embodiments of technologies disclosed herein.

Example 1 may comprise an apparatus comprising circuitry to buffer video data; and a DisplayPort Transmitter to communicate the video data to a DisplayPort Receiver via a virtual channel through at least one intermediate device between the DisplayPort Transmitter and the DisplayPort Receiver, wherein the virtual channel comprises a unidirectional Main-Link and a bidirectional auxiliary channel (AUX_CH); and communicate a power down signal over the Main-Link to the at least one intermediate device and the DisplayPort Receiver in conjunction with turning off the Main-Link to place the at least one intermediate device and the DisplayPort Receiver in respective low power states.

Example 2 may comprise the subject matter of example 1, wherein the at least one intermediate device comprises a plurality of devices to enter respective low power states responsive to receiving the power down signal.

Example 3 may comprise the subject matter of any of examples 1-2, wherein an intermediate device of the at least one intermediate device comprises a second DisplayPort Receiver and a second DisplayPort Transmitter.

Example 4 may comprise the subject matter of any of examples 1-3, wherein at least one intermediate device comprises one or more of a link training-tunable PHY repeater (LTTPR), a retimer, or a branch device.

Example 5 may comprise the subject matter of any of examples 1-4, wherein the power down signal is a first type of power down signal and the DisplayPort Transmitter is further to communicate a second type of power down signal over the Main-Link to the at least one intermediate device and the DisplayPort Receiver in conjunction with turning off the Main-Link to place the at least one intermediate device and the DisplayPort Receiver in different respective low power states.

Example 6 may comprise the subject matter of any of examples 1-5, wherein the DisplayPort transmitter is to wait an amount of time based on how many intermediate devices are between the DisplayPort transmitter and the DisplayPort receiver after communicating the power down signal before turning off the Main-Link.

Example 7 may comprise the subject matter of any of examples 1-6, wherein the power down signal is sent using a 128b/132b encoding scheme and the power down signal includes a control data indicator and an additional sequence.

Example 8 may comprise the subject matter of any of examples 1-7, wherein the DisplayPort transmitter is to send a wakeup signal to the at least one intermediate device and the DisplayPort receiver on the AUX_CH prior to turning the Main-Link back on.

Example 9 may comprise the subject matter of any of examples 1-8, wherein the DisplayPort transmitter is to bring up the Main-Link to transmit a frame indicator over the Main-Link to the DisplayPort receiver and to subsequently turn off the Main-Link until a next frame indicator is to be sent to the DisplayPort receiver, the frame indicator to enable maintenance of synchronization between the DisplayPort transmitter and the DisplayPort receiver Example 10 may comprise the subject matter of example 9, wherein the frame indicator is a blank start.

Example 11 may comprise the subject matter of example 9, wherein the frame indicator is a secondary data packet.

Example 12 may comprise the subject matter of any of examples 1-11, further comprising a graphics processing unit to generate the video data.

Example 13 may comprise the subject matter of any of examples 12, further comprising a central processing unit in communication with the graphics processing unit.

Example 14 may comprise an apparatus comprising circuitry to buffer video data; and a DisplayPort Receiver to: receive the video data from a DisplayPort Transmitter via a virtual channel through at least one intermediate device between the DisplayPort Transmitter and the DisplayPort Receiver, wherein the virtual channel comprises a unidirectional Main-Link and a bidirectional auxiliary channel (AUX_CH); and enter a low power state responsive to receiving, from a first intermediate device of the at least one intermediate device, a power down signal sent over the Main-Link by the DisplayPort Transmitter.

Example 15 may comprise the subject matter of example 14, wherein the at least one intermediate device comprises a plurality of devices to enter respective low power states responsive to receiving the power down signal.

Example 16 may comprise the subject matter of any of examples 14-15, wherein an intermediate device of the at least one intermediate device comprises a second DisplayPort Receiver and a second DisplayPort Transmitter.

Example 17 may comprise the subject matter of any of examples 14-16, wherein at least one intermediate device comprises one or more of a link training-tunable PHY repeater (LTTPR), a retimer, or a branch device.

Example 18 may comprise the subject matter of any of examples 14-17, wherein the power down signal is a first type of power down signal and the DisplayPort Receiver is further to receive a second type of power down signal over the Main-Link.

Example 19 may comprise the subject matter of any of examples 14-18, wherein the DisplayPort Receiver is to send a wakeup acknowledgement to the DisplayPort Transmitter after receiving a wakeup signal.

Example 20 may comprise the subject matter of any of examples 14-19, wherein the power down signal is sent using a 128b/132b encoding scheme and the power down signal includes a control data indicator and an additional sequence.

Example 21 may comprise the subject matter of any of examples 14-20, wherein the DisplayPort Receiver is to receive a wakeup signal from the DisplayPort Transmitter on the AUX_CH prior to the Main-Link being turned back on.

Example 22 may comprise the subject matter of any of examples 14-21, wherein the DisplayPort Receiver is to receive a periodic frame indicator from the DisplayPort Transmitter, the frame indicator to enable maintenance of synchronization between the DisplayPort transmitter and the DisplayPort receiver Example 23 may comprise the subject matter of example 22, wherein the frame indicator is a blank start.

Example 24 may comprise the subject matter of example 22, wherein the frame indicator is a secondary data packet.

Example 25 may comprise the subject matter of any of examples 14-24, further comprising a scaler chip including the DisplayPort Receiver.

Example 26 may comprise the subject matter of any of examples 25, further comprising a display panel to generate light or allow for transmission of light in a plurality of pixels of the display panel.

Example 27 may include a method comprising communicating, by a DisplayPort Transmitter, video data to a DisplayPort Receiver via a virtual channel through at least one intermediate device between the DisplayPort Transmitter and the DisplayPort Receiver, wherein the virtual channel comprises a unidirectional Main-Link and a bidirectional auxiliary channel (AUX_CH); and communicating, by the DisplayPort Transmitter, a power down signal over the Main-Link to the at least one intermediate device and the DisplayPort Receiver in conjunction with turning off the Main-Link to place the at least one intermediate device and the DisplayPort Receiver in respective low power states.

Example 28 may include the subject matter of example 27, further comprising waiting an amount of time based on how many intermediate devices are between the DisplayPort Transmitter and the DisplayPort Receiver after communicating the power down signal before turning off the Main-Link.

Example 29 may include the subject matter of any of examples 27-28, further comprising sending, by the DisplayPort Transmitter a wakeup signal to the at least one intermediate device and the DisplayPort Receiver on the AUX_CH prior to turning the Main-Link back on.

Example 30 may include the subject matter of any of examples 27-29, further comprising bringing up the Main-Link to transmit a frame indicator over the Main-Link to the DisplayPort Receiver and subsequently turning off the Main-Link until a next frame indicator is to be sent to the DisplayPort Receiver, the frame indicator to enable maintenance of synchronization between the DisplayPort Transmitter and the DisplayPort Receiver.

We claim:
1. An apparatus comprising:
circuitry to buffer video data; and
a DisplayPort Transmitter to:
communicate the video data to a DisplayPort Receiver via a virtual channel through at least one intermediate device between the DisplayPort Transmitter and the DisplayPort Receiver, wherein the virtual channel comprises a unidirectional Main-Link and a bidirectional auxiliary channel (AUX_CH);
communicate a power down signal over the Main-Link to the at least one intermediate device and the DisplayPort Receiver in conjunction with turning off the Main-Link to place the at least one intermediate device and the DisplayPort Receiver in respective low power states; and
communicate a plurality of frame indicators to the DisplayPort Receiver after the power down signal is communicated over the Main-Link and prior to communication of a wakeup signal to the DisplayPort Receiver.

2. The apparatus of claim 1, wherein the at least one intermediate device comprises a plurality of devices to enter respective low power states responsive to receiving the power down signal.

3. The apparatus of claim 1, wherein an intermediate device of the at least one intermediate device comprises a second DisplayPort Receiver and a second DisplayPort Transmitter.

4. The apparatus of claim 1, wherein at least one intermediate device comprises one or more of a link training-tunable PHY repeater (LTTPR), a retimer, or a branch device.

5. The apparatus of claim 1, wherein the power down signal is a first type of power down signal and the DisplayPort Transmitter is further to communicate a second type of power down signal over the Main-Link to the at least one intermediate device and the DisplayPort Receiver in conjunction with turning off the Main-Link to place the at least one intermediate device and the DisplayPort Receiver in different respective low power states.

6. The apparatus of claim 1, wherein the DisplayPort Transmitter is to transmit valid symbols for an amount of time based on how many intermediate devices are between the DisplayPort Transmitter and the DisplayPort Receiver after communicating the power down signal before turning off the Main-Link.

7. The apparatus of claim 1, wherein the power down signal is sent using a 128b/132b encoding scheme and the power down signal includes a control data indicator and an additional sequence.

8. The apparatus of claim 1, wherein the DisplayPort Transmitter is to send a wakeup signal to the at least one intermediate device and the DisplayPort Receiver on the AUX_CH prior to turning the Main-Link back on.

9. The apparatus of claim 1, wherein the DisplayPort Transmitter is to bring up the Main-Link to transmit a frame indicator of the plurality of frame indicators over the Main-Link to the DisplayPort Receiver and to subsequently turn off the Main-Link until a next frame indicator of the plurality of frame indicators is to be sent to the DisplayPort Receiver, the frame indicator to enable maintenance of synchronization between the DisplayPort Transmitter and the DisplayPort Receiver, wherein the frame indicator does not include active video data.

10. The apparatus of claim 9, wherein the frame indicator is a blank start.

11. The apparatus of claim 9, wherein the frame indicator is a secondary data packet.

12. The apparatus of claim 1, further comprising a graphics processing unit to generate the video data.

13. The apparatus of claim 12, further comprising a central processing unit in communication with the graphics processing unit.

14. An apparatus comprising:
circuitry to buffer video data; and
a DisplayPort Receiver to:
receive the video data from a DisplayPort Transmitter via a virtual channel through at least one intermediate device between the DisplayPort Transmitter and the DisplayPort Receiver, wherein the virtual channel comprises a unidirectional Main-Link and a bidirectional auxiliary channel (AUX_CH);
enter a low power state responsive to receiving, from a first intermediate device of the at least one intermediate device, a power down signal sent over the Main-Link by the DisplayPort Transmitter; and
while in the low power state, maintain frame timing synchronization with the DisplayPort Transmitter through a plurality of frame indicators sent by the DisplayPort Transmitter.

15. The apparatus of claim 14, further comprising a scaler chip including the DisplayPort Receiver.

16. The apparatus of claim 15, further comprising a display panel to generate light or allow for transmission of light in a plurality of pixels of the display panel.

17. A method comprising:
communicating, by a DisplayPort Transmitter, video data to a DisplayPort Receiver via a virtual channel through at least one intermediate device between the DisplayPort Transmitter and the DisplayPort Receiver, wherein the virtual channel comprises a unidirectional Main-Link and a bidirectional auxiliary channel (AUX_CH);
communicating, by the DisplayPort Transmitter, a power down signal over the Main-Link to the at least one intermediate device and the DisplayPort Receiver in conjunction with turning off the Main-Link to place the at least one intermediate device and the DisplayPort Receiver in respective low power states; and
communicating, by the DisplayPort Transmitter to the DisplayPort Receiver, a plurality of frame indicators to the DisplayPort Receiver after the power down signal is communicated over the Main-Link and prior to communication of a wakeup signal to the DisplayPort Receiver, the plurality of frame indicators to enable the DisplayPort Receiver to maintain frame timing synchronization with the DisplayPort Transmitter.

18. The method of claim 17, further comprising waiting an amount of time based on how many intermediate devices are between the DisplayPort Transmitter and the DisplayPort Receiver after communicating the power down signal before turning off the Main-Link.

19. The method of claim 17, further comprising sending, by the DisplayPort Transmitter a wakeup signal to the at least one intermediate device and the DisplayPort Receiver on the Main-Link prior to turning the Main-Link back on.

20. The method of claim 17, further comprising bringing up the Main-Link to transmit a frame indicator of the plurality of frame indicators over the Main-Link to the DisplayPort Receiver and subsequently turning off the Main-Link until a next frame indicator of the plurality of frame indicators is to be sent to the DisplayPort Receiver, the frame indicator to enable maintenance of synchronization between the DisplayPort Transmitter and the DisplayPort Receiver.

* * * * *